United States Patent [19]

Dye

[11] Patent Number: 4,722,070
[45] Date of Patent: Jan. 26, 1988

[54] MULTIPLE OSCILLATION SWITCHING CIRCUIT

[75] Inventor: Thomas A. Dye, Austin, Tex.

[73] Assignee: Texas Instruments Incorporated, Dallas, Tex.

[21] Appl. No.: 882,019

[22] Filed: Jul. 3, 1986

Related U.S. Application Data

[63] Continuation of Ser. No. 451,986, Dec. 21, 1982, abandoned.

[51] Int. Cl.[4] .............................................. G06F 1/04
[52] U.S. Cl. ..................................................... 364/900
[58] Field of Search ... 364/200 MS File, 900 MS File

[56] References Cited

U.S. PATENT DOCUMENTS

| | | | |
|---|---|---|---|
| 3,676,858 | 7/1972 | Finch et al. | 364/200 |
| 3,950,735 | 4/1976 | Patel | 364/200 |
| 4,003,032 | 1/1977 | Austin et al. | 364/200 |
| 4,050,096 | 9/1977 | Bennett et al. | 364/200 |
| 4,095,267 | 6/1978 | Morimoto | 364/200 |
| 4,321,687 | 3/1982 | Parsons et al. | 364/900 |
| 4,366,540 | 12/1982 | Berglund et al. | 364/200 |

*Primary Examiner*—Eddie P. Chan
*Attorney, Agent, or Firm*—Mel Sharp; Leo N. Heiting

[57] ABSTRACT

A multiple oscillator switching circuit for a digital processing system that includes a central processing unit having a first internal timing cycle and connected to a plurality of peripheral devices, each peripheral device having an independent internal timing cycle. The central processing unit is further connected to an oscillator switching circuit. The oscillator switching circuit includes several oscillators. Each oscillator has an output consisting of an independent internal frequency. A selected number of these oscillators have independent internal frequencies that correspond to the internal timing of the peripheral devices. These oscillator switching circuits are further connected to the central processing unit and to the output of each of the oscillators for providing a single oscillator output to the central processing unit in response to an output from the central processing unit. This capability allows the central processing unit to control its internal timing in order to slow the central processing unit to a timing cycle that will match the timing cycle of the peripheral devices. In addition the oscillator switching circuits provide an impedance matching between the output of the oscillators and the input to the central processing unit.

5 Claims, 3 Drawing Figures

MULTIPLE OSCILLATION SWITCHING CIRCUIT

This application is a continuation, of application Ser. No. 451,986, filed Dec. 21, 1982, now abandoned.

BACKGROUND

1. Field of the Invention

This invention relates to digital processing systems and more specifically to digital processing systems requiring multiple internal timing cycle operations.

2. Description of the Prior Art

Digital processing systems include external oscillators that providing timing signals to govern the internal clocks of the central processing unit. Problems arise when the timing of the central processing unit is different from the timing of a peripheral device that is connected to the central processing unit. One solution is to slow the faster device to the speed of the slower device by using the slower device oscillator to govern the internal timing of all devices. This solution is inefficient when using a high speed central processing unit, since the central processing unit will not be allowed to take full advantage of its speed capability. Another solution is to use external flip-flops to switch between different oscillators that are connected to different peripherals in order to slow the central processing down. Two basic problems arise from this solution. The first is the synchronization problem in turning off one oscillator and turning on another ascillator and second, the amount of space required to implement the flip-flop approach.

It is the object of the present invention to provide a switching means that allows an external control device or the central processing unit itself to change the internal timing of the central processing unit to match the internal timing of external peripheral devices that are provided by a separate oscillator.

SUMMARY OF THE INVENTION

In accordance with the present invention, a digital processing system is provided that includes a central processing unit having a first internal timing cycle and connected to a plurality of peripheral devices where each peripheral device includes an independent internal timing cycle. The central processing unit is further connected to an oscillator switching circuit. The oscillator switching circuit includes several oscillators, each oscillator having a separate output consisting of an independent internal frequency. At least some of the independent internal frequencies from these oscillators correspond to the requirements for the independent internal timing for the peripheral devices. The oscillator switching circuitry further includes a switching circuit that is connected directly to the central processing unit and to the output of each of the oscillators. This switching circuit provides a single oscillator output to the central processing unit in response to an output from the central processing unit. In addition, these switching circuits provide an impedance matching interface between the output of the oscillator and the central processing unit. The result is that the central processing unit may regulate its internal timing in order to match the internal timing of the external peripheral.

BRIEF DESCRIPTION OF THE DRAWINGS

This invention, as well as other objects, features and advantages thereof, may best be understood by reference to the following detailed description of the preferred embodiment, when read in conjunction with the accompanying drawings, wherein.

DESCRIPTION OF THE PREFERRED EMBODIMENT

Figure 1:
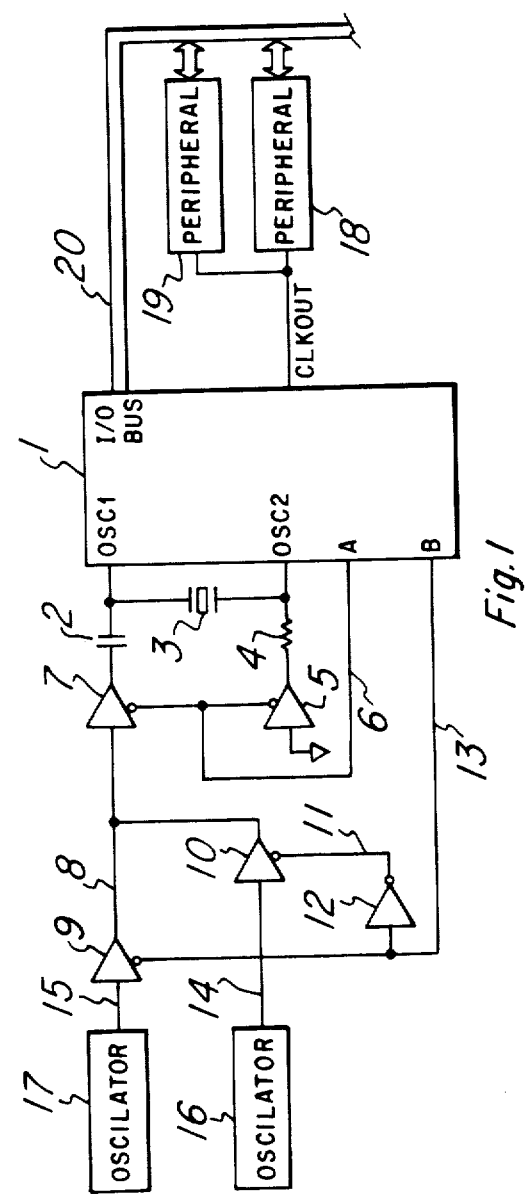
FIG. 1 is a schematic diagram of the multiple oscillator switching circuit.

The preferred embodiment of this invention provides a switching circuit that allows a computer microprocessor or microcomputer to alter the input oscillator that is used for internal timing in the digital processing unit. The oscillator inputs for many digital processing devices receive an oscillating signal that is reduced by internal timing circuitry in the digital processing device to be used for internal clocking. In FIG. 1, such a digital processing device is illustrated as block 1. In the preferred embodiment, block 1 is a Texas Instruments TMS 99000 microprocessor chip that includes several input and output pins. Two of these input pins are labeled OSC1 and OSC2 denoting the oscillator 1 and oscillator 2 inputs. In normal operation, the manufacture suggests that oscillator 1 and oscillator 2 receive an oscillating signal of a certain frequency to provide the necessary internal timing for the microprocessor. It is common practice to provide a crystal oscillator between OSC1 and OSC2 to provide this oscillator signal. It should be noted also that the input into OSC2 is the opposite of the input into OSC1. If the input to OSC1 is a sine wave, the input into OSC2 would lag 180 degrees. Microprocessor 1 also contains an output line labeled CLKOUT or clockout. This signal provides external timing signals to peripheral devices (peripheral 18 and peripheral 19). Microprocessor 1 is also connected to peripheral 18 and peripheral 19 via Input/Output bus 20. Two other outputs A and B are provided to alter the oscillator inputs to the microprocessor 1. This allows the microprocessor 1 to alter the timing inputs to itself when it is to interface with a slower peripheral. Output A is connected by line 6 to the two three state bus buffer gates 7 and 5. The output of gate 7 is connected to capacitor 2 which is in turn connected with one side of crystal 3 and the input OSC1. Buffer 5 is connected to resistor 4 which is in turn is connected to the other side of crystal 3 and to OSC2. The input to buffer 5 is tied to ground. The input to buffer 7 is tied to the external oscillator select circuitry consisting of bus buffers 9 and 10 and inverter 12. Output B is connected to the tristate enable of buffer 9 and to inverter 12 which is in turn connected by line 11 to the tristate enable of buffer 10. Line B from microprocessor 1 serves to select oscillator inputs from either oscillator 17 on line 15 or oscillator 16 on line 14. Lines A and B must provide a static output signal. If the microprocessor only provides dynamic signals, these signals must be latched by external circuitry.

When line A is high, buffers 7 and 5 are turned off and the microprocessor 1 operates from the crystal 3. Capacitor 2 serves as a dc blocking capacitor necessary to block any dc current from the output of buffer 7. When an external oscillator input is desired, line A becomes inactive, thus activating buffers 7 and 5. The input to OSC2 through buffer 5 is pulled low with resistor 4 to pull the crystal out of the circuit. The sole input then is to OSC1 from buffer 7. Buffer 7 receives its input from line 8 which in turn receives it input from either buffer 9 or 10, depending upon the state of signal B on line 13. If B is active, line 13 will turn off buffer 9 and provide an active input into inverter 12 which is inverted into an inactive input on line 11, turning on buffer 10; therefore the input to buffer 7 over line 8 will be the oscillator input on line 14. In a similar manner, if B is inactive buffer 9 will turn on allowing the oscillator input from line 15 to be placed to the input of buffer 7 through line 8.

In the preferred embodiment, the four tristate buffers 5, 7, 9 and 10 are similar to those in a 74LS125. This integrated circuit is discussed in the TTL Data Book for Design Engineers, 2nd Ed. by Texas Instruments Incorporated on pages 5-37 and 6-33 through 6-35 which are herein incorporated by reference.

Figure 2:
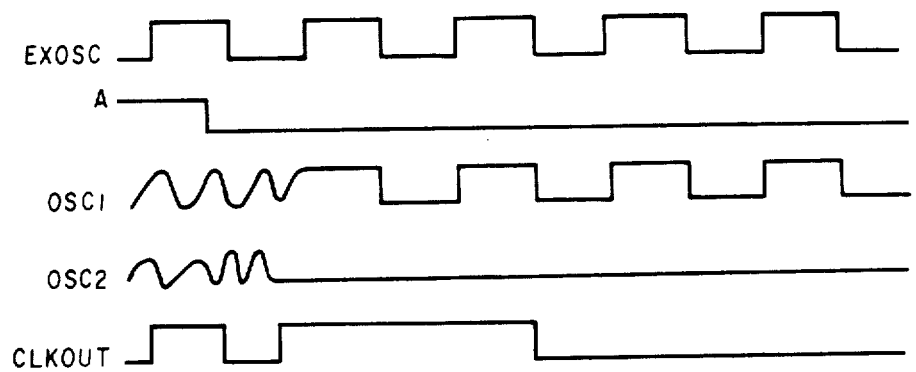
FIG. 2 is a timing diagram illustrating the switching to an external oscillator.

FIG. 2 illustrates a timing diagram of the oscillator inputs when the microporcessor is switching from the crystal oscillator to an external oscillator labeled EXOSC in FIG. 2. EXOSC can be either line 14 or 15 and will be selected by the B output from the microporcessor 1 in FIG. 1.

Referring to FIG. 2, when line A drops the crystal oscillator shown as inputs to OSC1 and OSC2 changes. OSC1 begins oscillating according to EXOSC since the crystal has been turned off and the external signal EXOSC has been input through buffer 7 as shown in FIG. 1. The input into OSC2 has been turned off since buffer 5 and resistor 4 have effectively decoupled the crystal 3 as shown in FIG. 1. The signal CLKOUT from the microprocessor is an output provided for external devices and is clocked at one-fourth of the rate of the internal oscillator clock. In FIG. 2 this signal is shown to illustrate the difference between the internal clocking from the crystal and the external source.

Figure 3:
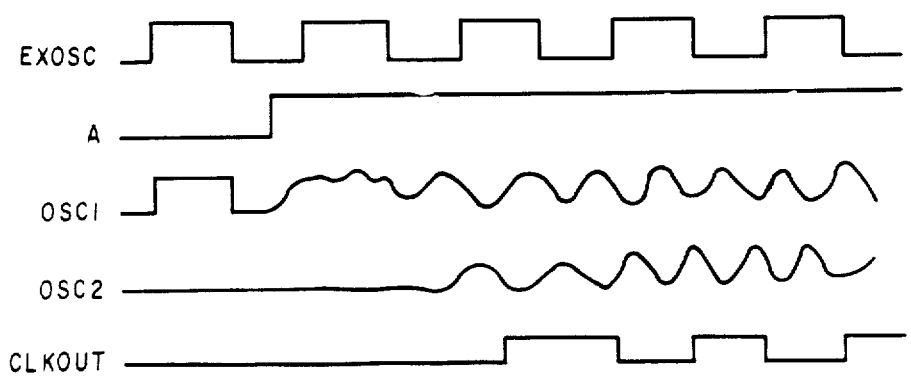
FIG. 3 is a timing diagram illustrating the change from the external oscillator to the crystal oscillator.

FIG. 3 illustrates the change from the external oscillator back to the crystal. It should be noted that during this change, the microprocessor must be in a reset or hold mode in order to allow the timing on OSC1 and OSC2 become stablized. This may be accomplished with external circuitry that upon an output received from the microprocessor places the microprocessor in a reset or hold mode for a set length of time sufficient to allow the oscillator inputs from the crystal to stabilize. Referring to FIG. 3, the external oscillator signal is still present, however, line A becomes high thus inactivating the buffers 7 and 9 in FIG. 1 and effectively blocking the input of EXOSC to the microprocessor 1. Since in their off state these tristate buffers look like capacitors to ground, the crystal 3 begins to oscillate again providing the oscillator inputs to OSC1 and OSC2 as illustrated. The CLKOUT signal also indicates the faster frequency of the crystal as shown.

This circuit allows either a crystal or an external oscillator to be input into the microprocessor circuit in such a manner that the crystal is provided with capacitors to ground as recommended for crystal oscillation when the crystal has been selected as the oscillator source or by providing a direct oscillator input into OSC1 and turning off the crystal. Further, by using the tristate logic as illustrated in FIG. 1, multiple oscillator sources may by used that are selected by the microprocessor according to output lines available from the microprocessor. It should be obvious to one skilled in the art that more than two external oscillator sources may be used by simply expanding the number of buffers and by implementing these buffers with additional output lines from the microprocessor.

What we claim is:

1. A digital processing system comprising:
   a plurality of peripheral devices, each peripheral device having an independent internal timing cycle;
   a plurality of oscillator means, each having an output consisting of an independent internal frequency corresponding to the internal timing of at least one peripheral device;
   a central processing unit connected to said plurality of peripheral devices, having at least one clock signal input, a first internal timing cycle corresponding to the frequency of the signal received on said at least one clock signal input, and at least one oscillator selection output;
   an oscillator switching circuit connected to said central processing unit and the output of each of said oscillator means for providing a single oscillator output to said at least one clock signal input of said central processing unit in response to said oscillation selection output from the central processing unit so as to conform the internal timing of said central processing unit to that of at least one of said peripheral devices;
   said at least one oscillator selection output includes a first oscillator selection output for choosing between a primary oscillator signal and said plurality of oscillator means and at least one second oscillator selection output for selecting a secondary oscillator signal from among said plurality of oscillator means; and
   said oscillator switching circuit includes a primary oscillator connected to said at least one clock signal input for generating said primary oscillator signal, primary switching means connected to said first oscillator selection output for enabling or disabling said primary oscillator and secondary switching means connected to said at least one second oscillator selection output for coupling the output of one of said plurality of oscillator means to said at least one clock signal input in accordance with said at least one second oscillation selection output.

2. A digital processing system as claimed in claim 1, wherein: said primary oscillator comprises a crystal oscillator.

3. A digital processing system comprising:
   a central processing unit connected to a plurality of peripheral devices, having at least one clock signal input, a first internal timing cycle corresponding to the frequency of the signal received on said at least one clock signal input, and at least one oscillator selection output;
   an oscillator switching circuit connected to said central processing unit having a plurality of oscillator input lines, each for receiving an oscillator signal, for providing a single oscillator output to said at least one clock signal input of said central processing unit in response to said oscillation selection output from the central processing unit so as to conform the internal timing of said central processing unit to that of at least one of said peripheral devices;
   said at least one oscillator selection output includes a first oscillator selection output for choosing between a primary oscillator signal and said plurality of oscillator means and at least one second oscillator selection output for selecting a secondary oscillator signal from among said plurality of oscillator means; and said oscillator switching circuit includes a primary oscillator connected to said at least one clock signal input for generating said primary oscillator signal, primary switching means connected to said first oscillator selection output for enabling or disabling said primary oscillator and secondary switching means connected to said at least one second oscillator selection output for coupling the output of one of said plurality of oscillator means to said at least one clock signal input in accordance with said at least one second oscillation selection output.

4. A digital processing system as claimed in claim 3, wherein:

said at least one clock signal input includes a first clock signal input and a second clock signal input;

said primary oscillator includes a crystal having first and second terminals connected to said first and second clock signal inputs of said central processing unit, respectively;

said primary switching means comprises a first tristate buffer having an input for receiving said selected secondary oscillator signal, an output AC coupled to said first terminal of said crystal and a control input connected to said first oscillator selection output, and a second tristate buffer having an input connected to ground, an output connected to the said second terminal of said crystal and a control input connected to said first oscillator selection ouput, whereby when said first oscillator selection output is in a first state the outputs of said first and second tristate buffers is a high impedance enabling said crystal to oscillate and when said first oscillator selection output is in a second state said second tristate buffer disables oscillation of said crystal and said first tristate buffer applies said selected secondary oscillator signal to said first clock signal input of said central processing unit.

5. A digital processing system as claimed in claim 4, wherein:

said secondary switching means includes a plurality of third tristate buffers, each having an input connected to a corresponding one of said oscillator input lines, an output connected to said input of said first tristate buffer and a control input, and a third buffer selection means connected to said control input of each of said third tristate buffers for enabling only one of said third tristate buffers to pass the oscillator signal received on its corresponding oscillator input line, whereby the outputs of the other third tristate buffers is a high impedance.

* * * * *